(12) United States Patent
Smith et al.

(10) Patent No.: US 7,925,931 B1
(45) Date of Patent: Apr. 12, 2011

(54) SYSTEM AND METHOD OF HANDLING ERRONEOUS DATA IN COMPUTER SYSTEMS

(75) Inventors: Michael John Sebastian Smith, Palo Alto, CA (US); Mark A. Overby, Bothell, WA (US); Andrew Currid, Alameda, CA (US)

(73) Assignee: NVIDIA Corporation, Santa Clara, CA (US)

( * ) Notice: Subject to any disclaimer, the term of this patent is extended or adjusted under 35 U.S.C. 154(b) by 725 days.

(21) Appl. No.: 11/610,469

(22) Filed: Dec. 13, 2006

(51) Int. Cl.
*G06F 11/00* (2006.01)
(52) U.S. Cl. ......................................................... 714/43
(58) Field of Classification Search .................... 714/43
See application file for complete search history.

(56) References Cited

U.S. PATENT DOCUMENTS

| | | | |
|---|---|---|---|
| 3,872,444 A * | 3/1975 | Cleveland et al. ................. 710/1 |
| 4,453,213 A * | 6/1984 | Romagosa ...................... 714/30 |
| 6,505,310 B1 * | 1/2003 | Brown et al. .................... 714/43 |
| 6,601,210 B1 * | 7/2003 | Kagan ............................. 714/758 |
| 6,647,016 B1 * | 11/2003 | Isoda et al. ..................... 370/412 |
| 7,184,399 B2 * | 2/2007 | Lee et al. ........................ 370/230 |
| 7,197,662 B2 * | 3/2007 | Bullen et al. ....................... 714/6 |
| 7,360,033 B2 * | 4/2008 | Hum et al. ..................... 711/141 |
| 7,389,396 B1 * | 6/2008 | Goel et al. ..................... 711/167 |
| 7,406,652 B2 * | 7/2008 | Tseng et al. ................... 714/798 |
| 2007/0047436 A1 * | 3/2007 | Arai et al. ...................... 370/219 |
| 2007/0083725 A1 * | 4/2007 | Kasiolas et al. ............... 711/165 |
| 2007/0133578 A1 * | 6/2007 | Tani ............................... 370/401 |
| 2007/0208810 A1 * | 9/2007 | Mostafa ......................... 709/206 |
| 2008/0126852 A1 * | 5/2008 | Brandyberry et al. ............ 714/8 |
| 2008/0163007 A1 * | 7/2008 | Shaeffer et al. ................. 714/52 |
| 2008/0288825 A1 * | 11/2008 | Furukawa et al. .............. 714/43 |

* cited by examiner

*Primary Examiner* — Bryce P Bonzo
(74) *Attorney, Agent, or Firm* — Patterson & Sheridan, LLP

(57) ABSTRACT

Embodiments of the present invention provide a method for handling errors in data servers. Generally, embodiments of the invention enable a data packet that is marked as erroneous to be handled so that it is not committed to permanent storage. One or more components are configured to recognize a poisoned data indicator, and to respond to the indicator by taking programmed actions to delete the data, to stop the data from being transmitted, to notify upstream components, and to purge related data from downstream components.

19 Claims, 6 Drawing Sheets

SYSTEM AND METHOD OF HANDLING ERRONEOUS DATA IN COMPUTER SYSTEMS

BACKGROUND OF THE INVENTION

1. Field of the Invention

Embodiments of the present invention generally relate to the handling of data errors in computer systems.

2. Description of the Related Art

Data errors in computers can occur when a binary unit of information (i.e., bit) becomes unintentionally altered, causing a 1 to be read as 0, or vice-versa. The cause of the data error is typically some physical event that is not part of the intended function of the computer. Some examples of such events are: a cosmic ray striking a Random Access Memory (RAM) memory cell; a portion of a disk drive platter spontaneously flipping magnetization; or noise from background radiation degrading the signal in a network cable.

In the prior art, techniques have been devised to detect and correct data errors within specific computer components. For example, the use of error correction code (ECC) in RAM memory allows some errors to be corrected within the RAM memory itself. However, some types of errors cannot be corrected within the component in which they occur. In some cases, data is determined to be erroneous but cannot be corrected, and is then transferred to another component. It is possible that error may be not be detected by the downstream component. If the erroneous data is stored without notification to the user, it can appear to be normal data, and can cause further errors as it is later used by the system. This problem, known as silent data corruption, can lead to computer downtime and loss of critical data.

Some protocols in the art (e.g., HyperTransport, PCI Express) include data indicators to allow the erroneous data to be marked as "poisoned" in order to alert any downstream computer components that receive the data. However, even if the erroneous data is marked as poisoned, it is possible that the downstream components that receive the data are not configured to recognize the poisoned data indicator, or are not capable of correcting the error. If so, the result can be silent data corruption. Thus, there is a need in the art for a method of handling poisoned data so that data errors can be corrected in the most effective manner, and not lead to silent data corruption.

SUMMARY OF THE INVENTION

The present invention generally provides techniques for handling erroneous data.

One embodiment provides a method for handling erroneous data in a computer system. The method generally includes detecting in error in data by a first component in the system positioned in a data path between a source of the data and a target for the data, reporting the error to components upstream in the data path by setting one or more bits indicating the erroneous data, and halting transmission of data to downstream components.

Another embodiment provides a computer system configured to handle erroneous data. The computer system generally includes at least one component that is a source of data, at least one component that is a destination for data, at least one bus that transmits the data from the source components to the destination components, and at least one data handling component. The at least one data handling component incorporates error-handling logic configured to detect an error in data being transferred from a source of data to a destination for data, report the data error to one or more components upstream between the data handling component and the source of data, and halt transmission of the data to one or more downstream components between the data handling component and the destination for data.

Another embodiment provides a Serial Advanced Technology Attachment (SATA) controller. The controller generally includes a first interface for receiving data from an upstream device, a second interface for transmitting data to an SATA drive, a downstream device, and error-handling logic. The error-handling logic is generally configured to detect an error in data being transferred from the upstream device, report the data error to the upstream device, and halt transmission of the data to the SATA drive.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods for handling erroneous data so that the data errors can be corrected in the most effective manner, and not lead to silent data corruption. In one embodiment, a computer component, for example a Serial Advanced Technology Attachment (SATA) controller, is configured to handle a data frame according to a poisoned data indicator of the data protocols being used (e.g., HyperTransport, PCI Express). In this example, the embodiment of the invention is part of a typical computer system using the SATA storage protocol. Of course, a person of skill in the art will recognize that other embodiments of the invention could include, without limitation, a network system using the Ethernet protocol, a computer system using the Universal Serial Bus (USB) protocol, or other systems and protocol known in the art. Also, the computer component configured to handle erroneous data could be any component in the path of the data, including the disk drive itself.

Figure 1:
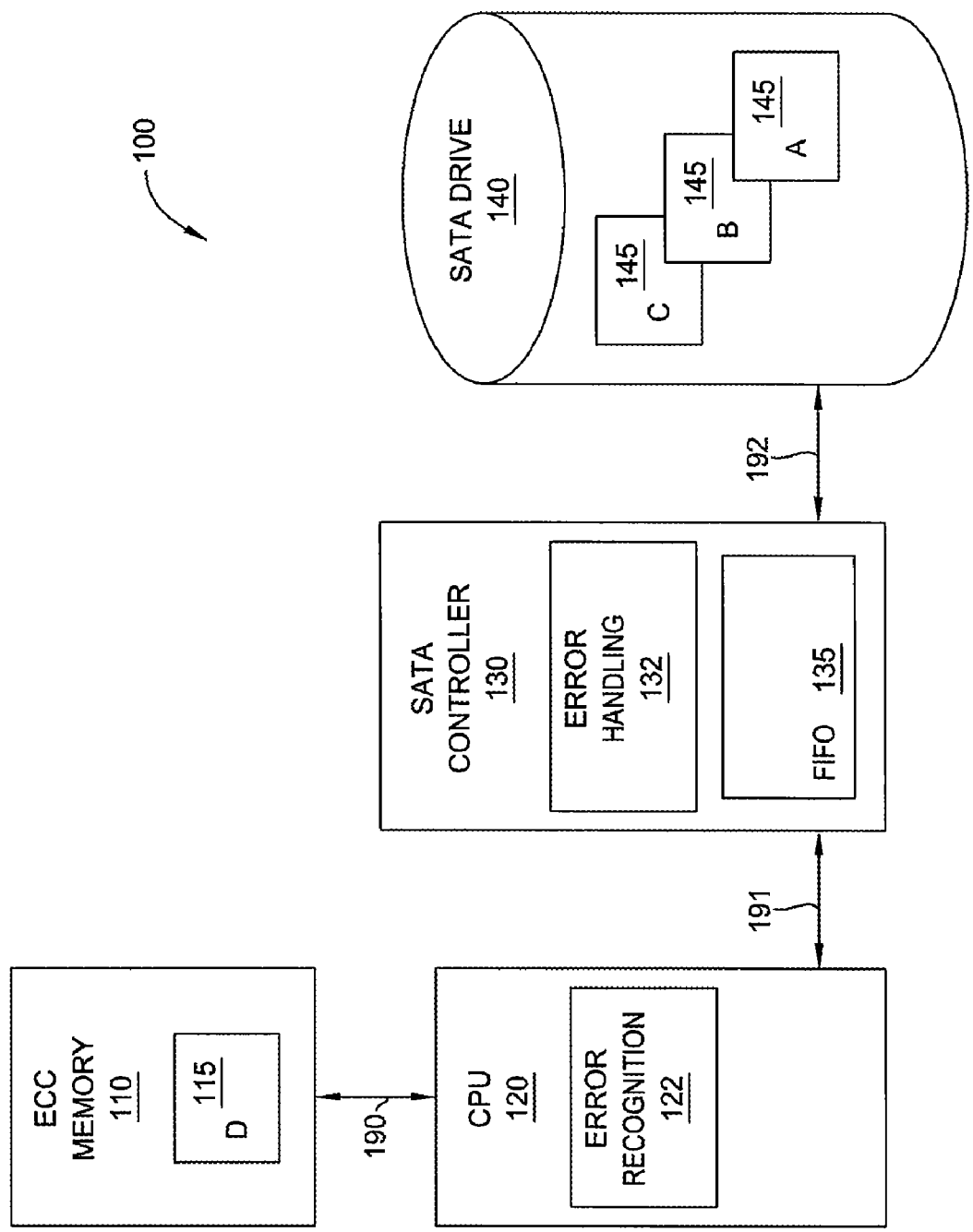
FIG. 1 illustrates an example of a computer system in a starting state, according to one embodiment of the invention.

FIG. 1 illustrates an example of a computer system in a starting state, according to one embodiment of the invention. As illustrated, exemplary computer system 100 is comprised, without limitation, of memory 110, Central Processing Unit (CPU) 120, SATA controller 130, and SATA drive 140. The components of computer system 100 are connected by data buses 190, 191, 192. Of course, a person skilled in the art will recognize that computer system 100 is greatly simplified for illustrative purposes, and could comprise different or additional components. Computer system 100 is in a starting state, prior to the transfer of a data frame D 115 from error correction code (ECC) memory 110 to CPU 120 via bus 190, then to SATA controller 130 via bus 191, and finally to SATA drive 140 via bus 192. In this example, a cosmic ray has impacted on the portion of ECC memory 110 storing data frame D 115. The cosmic ray has caused an error in data frame D 115 that ECC memory 110 is not able to correct.

As shown, CPU 120 comprises error recognition circuit 122. Error recognition circuit 122 evaluates incoming data according to techniques known in the art to detect if a data error has occurred. Some examples of error detection techniques known in the art are parity bits, checksums, and repetition schemes. The present invention is not limited to any particular error detection technique. In this example, SATA controller 130 comprises error handling circuit 132 and FIFO buffer 135. Error handling circuit 132 performs programmed functions to enable graceful recovery from a data error, according to one embodiment of the present invention. The function of Error handling circuit 132 is described below. As illustrated, SATA drive 140 stores data frames A, B, C 145. In this example, data frames A, B, C 145 and data frame D 115 are portions of a larger data file that is being transferred to SATA drive 140.

FIGS. 2A-D illustrate an example of the handling of a data error in a computer system, according to one embodiment of the invention. The example of FIGS. 2A-D is carried out in accordance to the method 300 illustrated in FIG. 3. In order to clarify the example illustrated in FIGS. 2A-D, the following explanation will be made with reference to method 300.

Figure 2A:
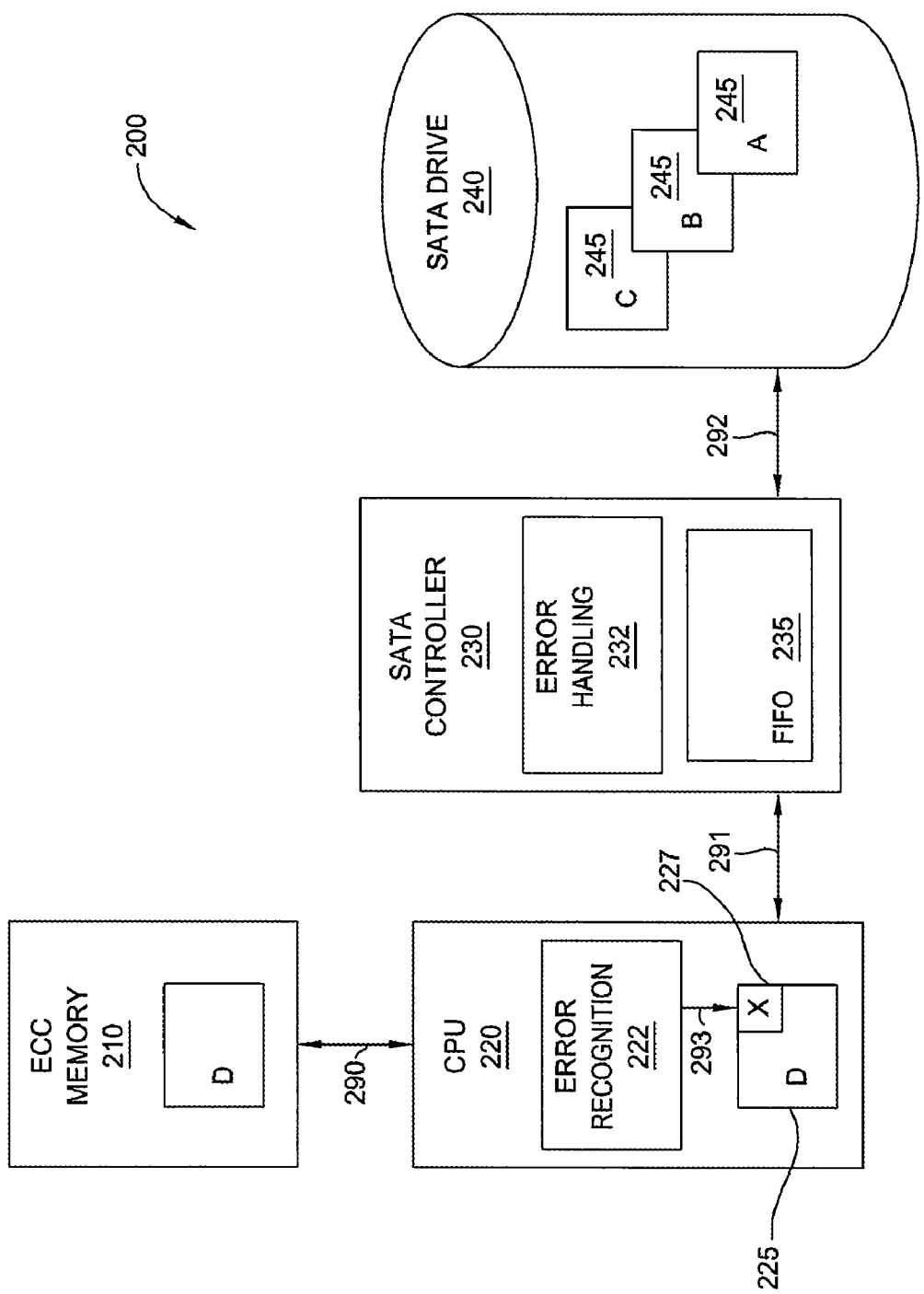
FIGS. 2A-D illustrates an example of the handling of a data error in a computer system, according to one embodiment of the invention.
Figure 3:
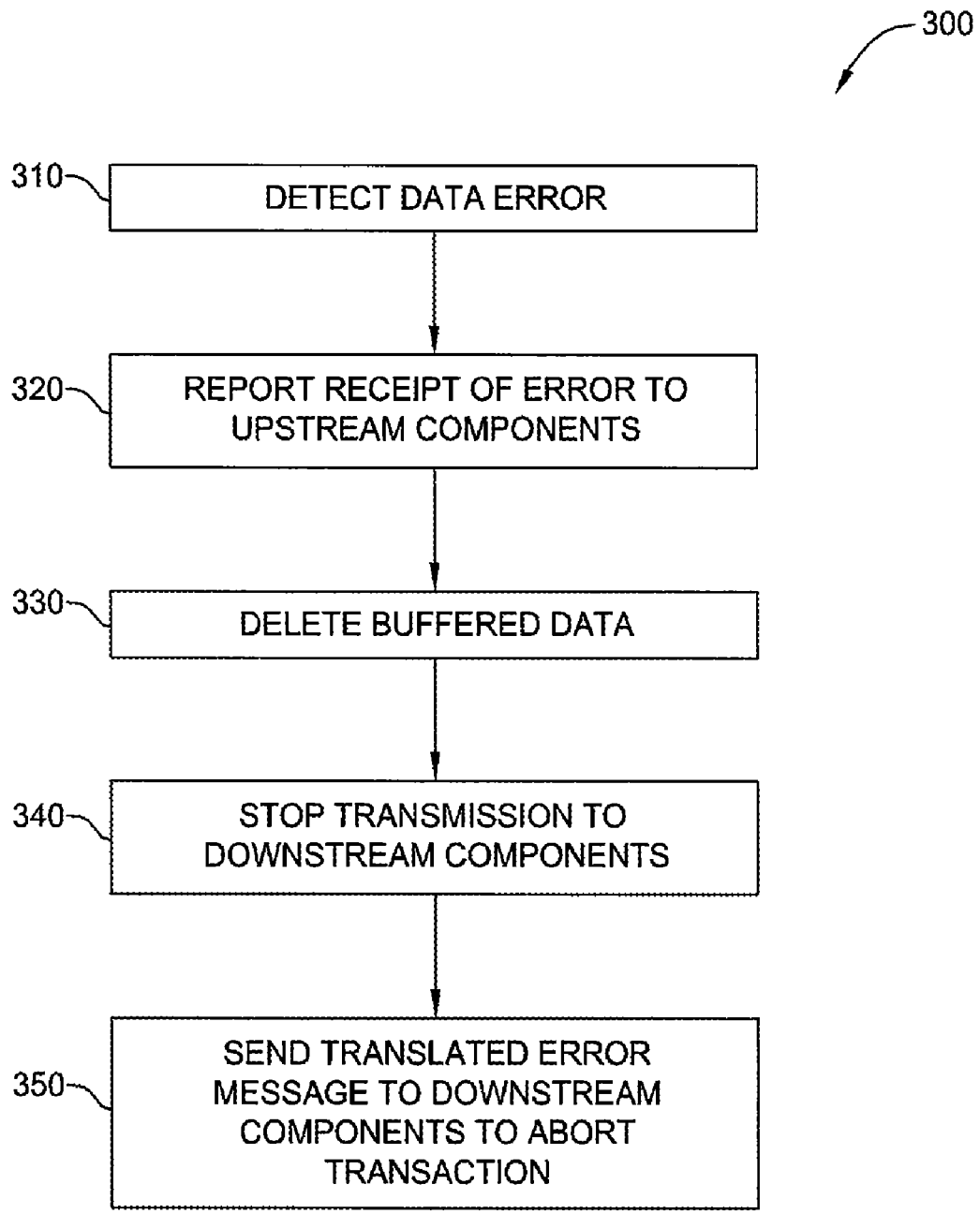
FIG. 3 illustrates a method of handling a data error in a computer system, according to one embodiment of the invention.

Method 300 begins at step 310, where a data error is detected. Step 310 of method 300 is illustrated by FIG. 2A. As shown in FIG. 2A, computer system 200 is the computer system 100 after the data frame D 115 has been copied to CPU 220, resulting in data frame D 225. In this example, error recognition circuit 222 of CPU 220 has detected the error in data frame D 225. Accordingly, error recognition circuit 222 carries out a marking process 293 which marks the data frame D 225 as erroneous, or "poisoned". The marking of data frame D 225 as poisoned data is accomplished with poisoned data indicator 227.

Figure 2B:
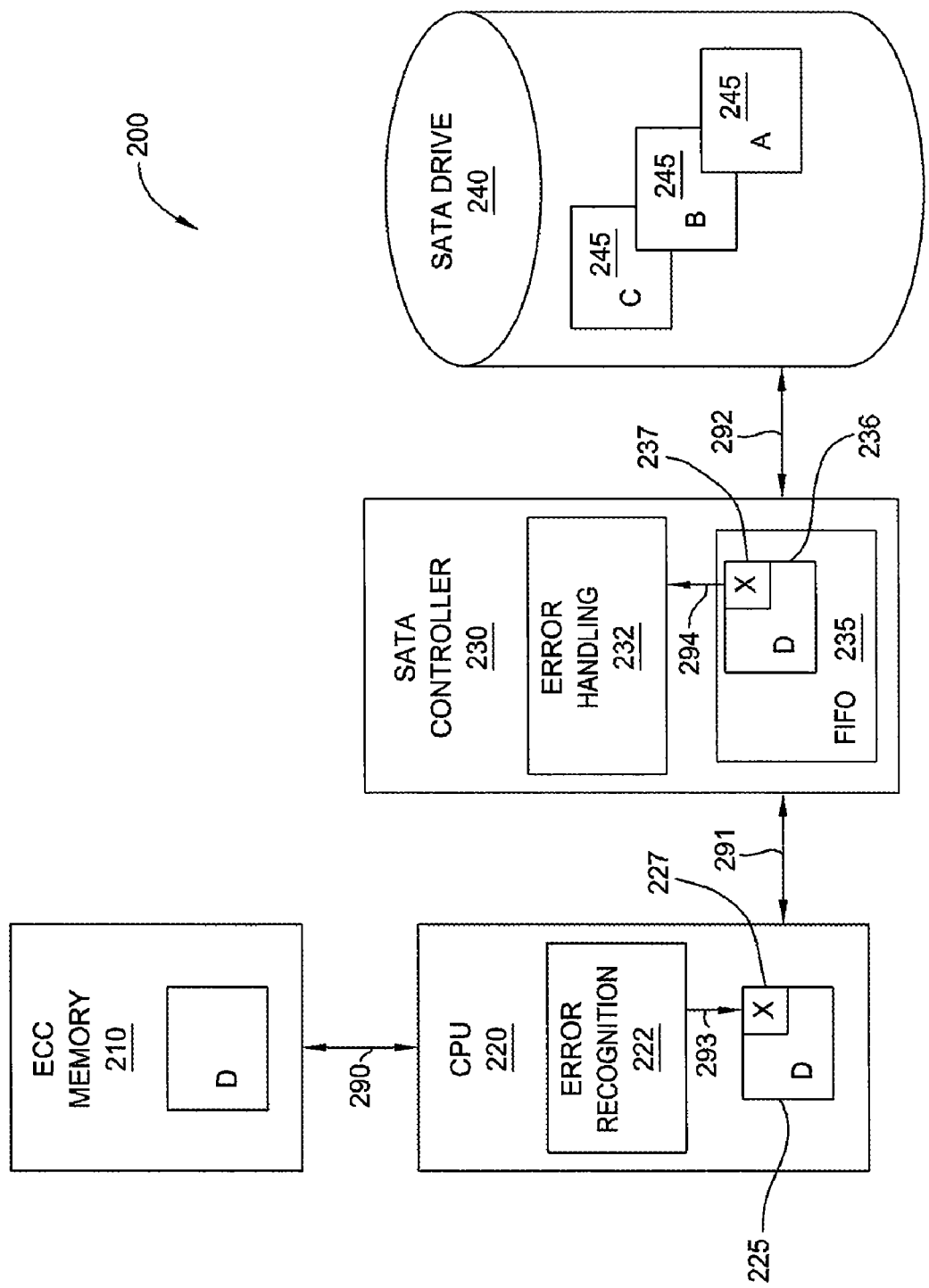

In FIG. 2B, the state of computer system 200 has progressed to the next stage, where the data frame D 225 has been copied to SATA controller 230 via bus 291, resulting in data frame D 236. SATA controller 230 stores data frame D 236 in FIFO buffer 235. As illustrated, data frame 236 comprises a poisoned data indicator 237. Poisoned data indicator 237 is received in the copy of data frame D 225, which included poisoned data indicator 227. The transmission of the poisoned data indicator 227 over bus 291 is a technique known in the art. For example, data protocols such as HyperTransport and PCI Express include functionality to transmit data similar to poisoned data indicator 227. When data frame D 236 is received in SATA controller 230, the presence of poisoned data indicator 237 causes a trigger 294 to activate error handling circuit 232. Error handling circuit 232 is configured to recognize poisoned data, and is programmed to perform actions to efficiently handle the poisoned data, according to one embodiment of the invention.

Figure 2C:
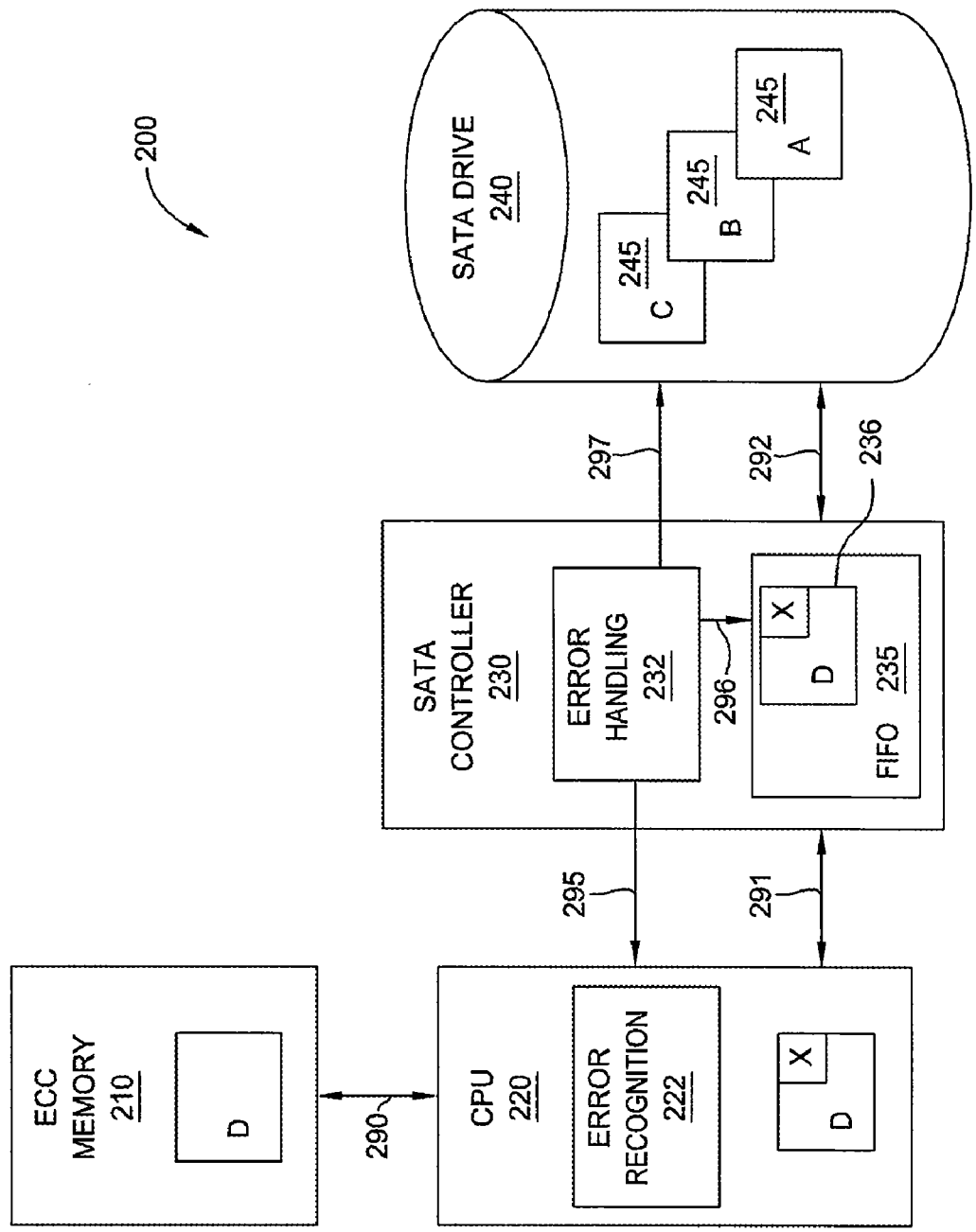

FIG. 2C continues the example of computer system 200 of FIG. 2B. In this stage, the error handling circuit 232 performs the programmed actions to respond to the poisoned data frame D 236 in SATA controller 230, according to one embodiment of the invention. The first action of error handling circuit 232, corresponding to step 320 of method 300, is to transmit an interrupt message 295 upstream to CPU 220 in order to provide notification of the problem. In this example, the interrupt message could be an Advanced Error Reporting (AER) interrupt message carried over the Hypertransport protocol. The second action of error handling circuit 232, corresponding to step 330 of method 300, is to send a data dump signal 296 to delete the data frame D 236 buffered in the FIFO 235. The third action of error handling circuit 232, corresponding to step 340 of method 300, is to stop any data transmissions to downstream components.

The fourth action of error handling circuit 232, corresponding to step 350 of method 300, is to translate the positive poisoned data indicator 237 to a cyclic redundancy check (CRC) error message 297, and transmit it downstream to SATA drive 240. When CRC error message 297 is received by SATA drive 240, the data frames A, B, C 245, all part of the same transaction as data frame D 235, are erased from SATA drive 240. The erasure of all frames that were part of the transaction that included the poisoned data frame D 235 prevents the writing of corrupted file data to SATA drive 240.

Figure 2D:
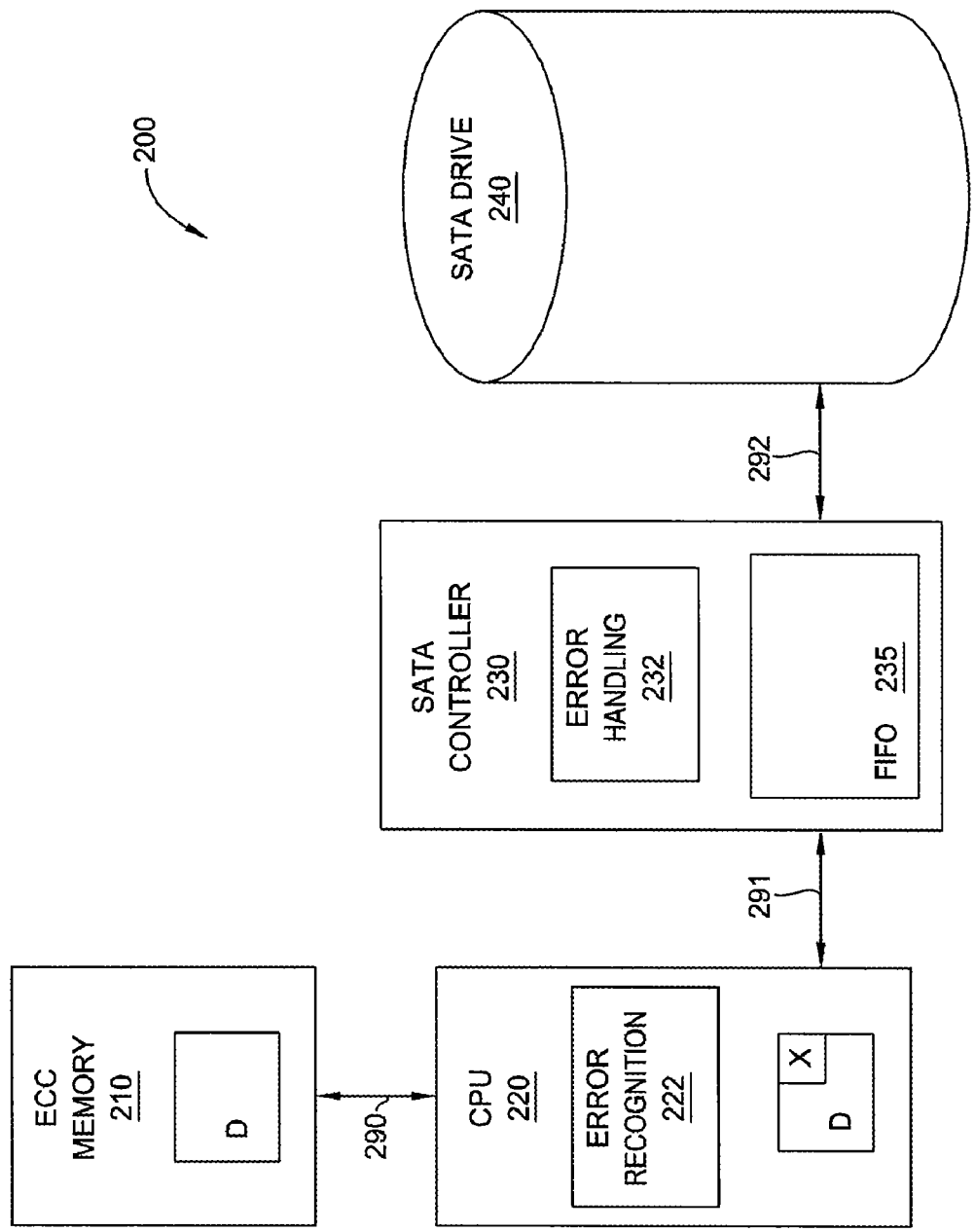

FIG. 2D continues the example of computer system 200 of FIG. 2C. In this stage, the programmed actions of error handling circuit 232 have resulted in the efficient handling of poisoned data frame D 236, and the minimization of silent data corruption. As shown, the poisoned data frame D 236 is no longer present in SATA controller 230, and is no longer being transmitted to downstream component SATA drive 240. Further, the data frames A, B, C 245, part of a transaction including poisoned data frame D 236, have not been written to the nonvolatile memory of SATA drive 240. Furthermore, CPU 220 has been notified by interrupt message 295 that the transaction including poisoned data frame D 236 has been aborted, and is thus enabled to carry out further programmed functions.

In contrast, if embodiments of the present invention were not included in computer system 200, the poisoned data could result in computer downtime and in loss of data. That is, if SATA controller 230 did not include an error handling circuit 232 to handle poisoned data indicator 137, the data transmission to SATA drive 240 could have taken place without interruption. Thus, poisoned data frame D 236 could have been written to nonvolatile storage in SATA drive 240 without marking the data as poisoned and without notification to the user. Also, if error handling circuit 232 had not sent CRC error message 297 downstream to SATA drive 240, data frames A, B, C 245 could have been left on SATA drive 240. Since the exemplary transaction required data frames A, B, C and D, the resulting file on SATA drive 240 would be incomplete and probably unusable. Finally, if error handling circuit 232 had not sent interrupt message 295 upstream to CPU 220, there may not be any mechanism in place to alert a user of the problem. In each of these three situations, the outcome is silent data corruption. Therefore, the embodiment of the invention illustrated in FIGS. 2A-D and in method 300 provides techniques of handling poisoned data that could be an improvement over the prior art.

FIGS. 2A-D illustrate an example in which the present invention is embodied in the error handling circuit 232 of a SATA controller 230. However, it is envisioned that other embodiments of the invention could include, without limitation, a network system, a USB controller, or a disk drive incorporating an error handling circuit 232.

While the foregoing is directed to embodiments of the present invention, other and further embodiments of the invention may be devised without departing from the basic scope thereof, and the scope thereof is determined by the claims that follow.

What is claimed is:

1. A method for handling erroneous data in a computer system, comprising:

detecting an error in data by a first component in the computer system positioned in a data path between a source of the data and a target for the data, wherein the first component is able to detect the error without receiving any feedback from the target;

reporting the error to components upstream in the data path by setting one or more bits indicating the error in the data; and halting transmission of the data to downstream components.

2. The method of claim 1, wherein:

the error is detected in a portion of data that is part of a data transaction including other portions already sent downstream; and the method further comprises sending a translated error message to downstream components to abort handling the transaction.

3. The method of claim 1, wherein:

the error is detected in a portion of data that is buffered in the first component; and the method further comprises deleting the buffered portion of data in which the error is detected.

4. The method of claim 1, wherein reporting the error to components upstream in the data path by setting one or more bits indicating erroneous data comprises setting a poisoned data indicator of a data protocols being used to transmit the data.

5. The method of claim 1, wherein reporting of the data error to upstream components is carried out by an interrupt message of the Hypertransport data protocol indicating an Advanced Error Reporting (AER) failure.

6. The method of claim 2, wherein the translated error message sent to downstream components is a cyclic redundancy check (CRC) message of the Serial Advanced Technology Attachment (SATA) storage protocol.

7. The method of claim 2, wherein the translated error message sent to downstream components is an error message of the Ethernet networking protocol.

8. The method of claim 2, wherein the translated error message sent to downstream components is a CRC message of the Universal Serial Bus (USB) data protocol.

9. The method of claim 1, wherein the first component is a central processing unit (CPU).

10. The method of claim 1, wherein the first component is a Serial Advanced Technology Attachment (SATA) controller.

11. A computer system configured to handle erroneous data, the computer system comprising:

at least one component that is a source of data;

at least one component that is a destination for data;

at least one bus that transmits the data from the source components to the destination components; and at least one data handling component incorporating error-handling logic configured to detect an error in data being transferred from a source of data to a destination for data, wherein the first component is able to the error without receiving any feedback from the target, report the data error to one or more components upstream between the data handling component and the source of data, and halt transmission of the data to one or more downstream components between the data handling component and the destination for data.

12. The computer system of claim 11, wherein the data handling component incorporating error-handling logic is a Serial Advanced Technology Attachment (SATA) controller.

13. The computer system of claim 12, wherein the destination component is a SATA drive.

14. The computer system of claim 10, wherein the component incorporating error-handling logic is a Universal Serial Bus (USB) controller.

15. The computer system of claim 10, wherein:

the data handling component detects the error in a portion of data that is part of a data transaction including other portions already sent downstream; and the data handling component sends a translated error message downstream components to abort handling the transaction.

16. A Serial Advanced Technology Attachment (SATA) controller, comprising:

a first interface for receiving data from an upstream device;

a second interface for transmitting data to an SATA drive; and error-handling logic configured to independently detect an error, without receiving any feedback from the SATA drive, in data being transferred from the upstream device, report the data error to the upstream device, and halt transmission of the data to the SATA drive.

17. The controller of claim 16, wherein:

the data handling component detects the error in a portion of data that is part of a data transaction including other portions already sent downstream; and the data handling component sends a translated error message to downstream components to abort handling the transaction.

18. The controller of claim 17, wherein:

the error is detected in a portion of data that is buffered in the first component; and the error-handling logic is further configured to delete the buffered portion of data in which the error is detected.

19. The controller of claim 16, wherein the error-handling logic reports the error to the upstream component by setting a poisoned data indicator of the data protocol being used to transmit the data.

* * * * *